United States Patent [19]

Matyschik

[11] 3,847,258

[45] Nov. 12, 1974

[54] CLUTCH RELEASE MECHANISM

[75] Inventor: Otto Matyschik, Nudlingen, Germany

[73] Assignee: SKF Industrial Trading and Development Company B.V., Amsterdam, Netherlands

[22] Filed: May 4, 1973

[21] Appl. No.: 357,263

[30] Foreign Application Priority Data
May 9, 1972    Germany............................ 174664

[52] U.S. Cl................ 192/98, 192/110 B, 308/151, 308/233
[51] Int. Cl.... F16d 23/00, F16d 11/08, F16c 19/00
[58] Field of Search.. 192/98, 109 A, 110 B, 111 A; 308/151, 174, 189, 233

[56] References Cited
UNITED STATES PATENTS

| | | | |
|---|---|---|---|
| 2,057,803 | 10/1936 | Tatter | 192/111 A |
| 2,061,093 | 11/1936 | Tatter | 192/111 A X |
| 3,416,637 | 12/1968 | Maurice | 192/98 |
| 3,420,346 | 1/1969 | Millward | 192/109 A X |
| 3,478,853 | 11/1969 | Kraeplin | 192/111 A |

Primary Examiner—Samuel Scott
Assistant Examiner—Lance W. Chandler
Attorney, Agent, or Firm—Murray Schaffer

[57] ABSTRACT

A clutch release mechanism having an axial bearing wherein one of the race members is interconnected with a retaining bolt or securing pin movably extending through a central hole or bore of the housing of the release mechanism. A spring is arranged between the housing and the race member which normally biases the housing and bearing assembly apart but which allows them to be moved inwardly relative to each other when wear occurs to the clutch. Preferably, the spring is a coil spring surrounding the retaining bolt and the spring travel is limited on inward depression by a sleeve bushing coaxial with the spring and the retaining bolt. The free traverse of housing and bearing assembly defines the degree of play of the clutch on its closing and opening actuation.

6 Claims, 3 Drawing Figures

PATENTED NOV 12 1974 3,847,258

CLUTCH RELEASE MECHANISM

BACKGROUND OF INVENTION

The present invention relates to a release mechanism for automotive clutches and the like and in particular to an arrangement for securing the bearing assembly thereof to its housing.

Release bearings for clutches, transmissions and the like, particularly for automobiles are known in which a grooved roller bearing is employed. Between the release plate and the rolling elements there is employed an elastic intermediate element, such as a corrugated annular ring or a ring formed from synthetic rubber or the like, which prevents the turning or rotating of the release plate, under the action of the releasing fork or transmission lever during the release of the clutch. However, these devices do not provide sufficient means by which the bearing assembly can be moved axially in a defined manner with respect to the housing of the release mechanism.

It is the object of the present invention to provide a clutch release bearing and a housing for the release mechanism which are so formed and interconnected that by the closing of the clutch facings an adjustable axial play is developed in the closing direction, when the clutch is worn and has play.

It is another object of the present invention to provide a clutch release mechanism having an axial bearing which is formed as a unitary assembly with the housing of the release mechanism.

It is a further object of the present invention to provide a clutch release mechanism in which the axial bearing and the housing of the release mechanism are movable with respect to each other over axially defined limits.

These objects as well as numerous advantages will be apparent from the foregoing description.

SUMMARY OF INVENTION

According to the present invention these objects and advantages, as well as others are obtained by providing a clutch release mechanism having an axial bearing wherein one of the race members is interconnected with a retaining bolt or securing pin movably extending through a central hole or bore of the housing of the release mechanism. A spring is arranged between the housing and the race member which normally biases the housing and bearing assembly apart but which allows them to be moved inwardly relative to each other on closing of the clutch when the clutch is worn.

Preferably, the spring is a coil spring surrounding the retaining bolt and the spring travel is limited on inward depression by a sleeve bushing coaxial with the spring and the retaining bolt. The free traverse of housing and bearing assembly defines the degree of play of the clutch on its closing and opening actuation.

So long as there is no wear and no play on the clutch plates the second race member is forced directly by the spring away from the housing. When, however, when wear occurs and a play does exist then the spring is depressed a distance corresponding to the play, until the sleeve bushing abuts against the wall of the housing. Thereafter, there can be no further depression of the spring.

By a further advantageous example of the present invention, the hole or bore in the house, through which the retaining bolt passes, is preferably made with a larger diameter than the retaining bolt so that a degree of radial play is also obtained. The retaining bolt is secured by a head or disk at its end which head is secured or fastened to the bolt so that the outward movement of the bearing assembly and the housing under action of the spring is also defined.

Furthermore, it is preferable to install the assembly of housing and bearing by locating the housing itself centrally in a bore or hole formed in the support or frame. In this manner the assembly is supported by its outer mantle and the support is not obtained through the retaining bolt.

A further advantage is obtained by having the edge of the second race member extend in the axial direction over the frontal side or outer side of the first race member to envelope it. As a result a retaining washer or annular disk may be secured over the edge. This will hold the first race member in place and hold the entire bearing assembly together as a single unitary assembly, which may then be transported and installed in assembled condition without fear of losing any of the parts.

Full details of the present invention are disclosed in the following description and are shown in the accompanying drawings.

DESCRIPTION OF THE INVENTION

Figure 1:
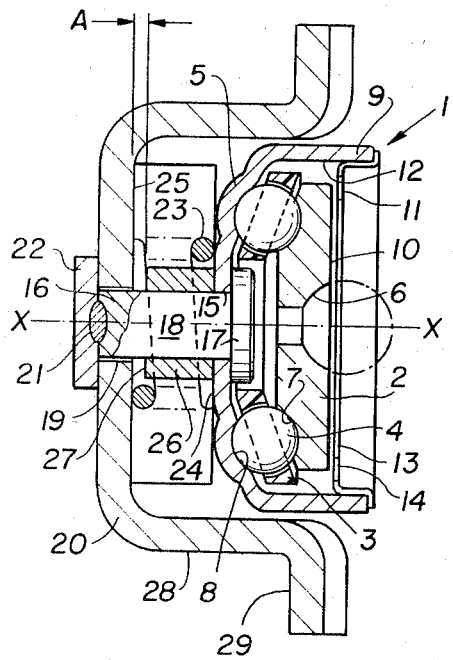
FIG. 1 is an axial section along the axis of rotation of a clutch release mechanism according to the present invention.

In FIG. 1 a clutch release bearing is generally depicted by the numeral 1. The bearing has, according to the present invention, an axis of rotation $x-x$ and comprises a first non-rotatable race member 2, a cage 3, a plurality of rolling elements secured in the cage and a second race member 5. The first race member 2 comprises a disk which is provided with a recess 6 on its outer face 10 in which the operating or actuating mechanism, (not shown) of the clutch is received. The race members 2 and 5 are formed with race surfaces or grooves 7 and 8 respectively in which the rolling elements 4 are adapted to run. The race surfaces 7 and 8 are formed so that the rolling elements have contact with the races angularly to the axis of rotation of the bearing. The second race member 5 is shaped like a cup having an edge 9 which extends annularly in an axial direction over the front or outer face 10 of the first race member 2. The interior of the extending edge 9 of the race member 5 forms a bore 12 in which is force fit a disk like annular member 11 which is itself provided with a central bore 13, the inner edge 14 of which overlies (extends radially over) a portion of the front or outer face 10 of the first race member 2 leaving a central bore for entry of the actuating element. The annular disk 11 serves to provide a covering or cap which holds the first race member 2, the cage 3, the rolling elements 4 and the second race member 5 together in a unitary assembly preventing the parts from coming apart and being lost before installation in the clutch unit. It also allows the assembly to be easily transported and installed.

The second race member 5 is provided with a central bore 15 through which a retaining bolt 16 having a retaining bead 17 is inserted. The shaft portion 18 of the bolt 16 is press fit within the bore 15 to eliminate radial play and provide conjoint movement. The retaining bolt 16 extends through a hole 19 formed in the housing 20 of the release bearing. The housing 20 is also cup shaped and the hole 19 is formed at its center with a slightly enlarged diameter so that the bolt 16 and the cup 20 have a degree of radial play. Welded as at 21 to the outer end of the shaft 18 is a disk 22 which permits axial movement of the retaining bolt 16 within a limited range. Surrounding the shaft 18 of the bolt 16 is coil spring 23 of enlarged diameter, relative to the pin which seats at one end on the outer face 24 of the second race member 5 and at the other end on the inner face 25 of the housing 20. Interposed coaxially between the surface of the shaft 18 and the spring 23 is a sleeve bushing 26 which is smaller in axial dimension or length than the overall possible distance between the outer face 24 of the race member and the inner face 25 of the housing. The free room or space between the end 27 of the sleeve bushing 26 and the inner face 25 of the housing is denoted by the letter " A " in FIG. 1 and defines the amount of play permitted the clutch during its closing or locking operation. So long as no wear of the clutch exists the spring 23 works directly on the housing 20 pushing it apart from the second race member. However, should there occur wear and a play at, the clutch, then the spring 23 is caused to be depressed and the bearing axially moved, more or less toward the housing 20 depending on the play of the clutch plates, until the end 27 of the sleeve bushing 26 contacts the inner face 25 of the housing.

The housing 20 has itself a cup shaped exterior 28 so that the bearing assembly substantially lies within it. The entire housing 20 is centered by its cup shaped exterior mantle 28 in a bore (not shown) of the frame or clutch housing support. The housing 20 is provided with radially or laterally extending ears 29 (FIG. 3) which serves for the installation of the assembly 1 with the operating apparatus or fork of the transmission.

Figures 2, 3:
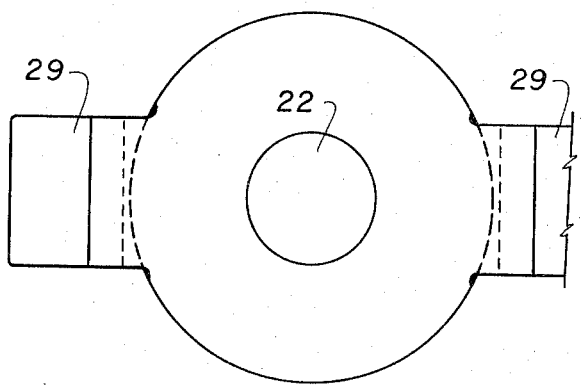
FIG. 2 is a similar view though a modified form of the bearing.
FIG. 3 is a plan view of the bearing according to FIGS. 1 or 2.

A modified form of the bearing according to the present invention is shown in FIG. 2. In this embodiment the construction of the assembly 1 is similar to that in FIG. 1 and corresponding elements bear corresponding numerals; however, here the outer mantle 30 of the edge 9 of the second race member 5 has the same diameter as the mantle 28 of the housing 20. The second race member 5 is so formed and oriented that even when the spring 23 is depressed over the space or distance " A " the outer face 24 will not come into contact with the housing 20. Otherwise the structure and operation of the embodiment in FIG. 2 is the same as that of FIG. 1.

The use of a helical spring 23 and of a sleeve bushing 26 insures the provision of sufficient space " A " which corrects the closing play of the clutch. Because of the large installation face of the spring on the surfaces 24 and 25 the spring does not dig into the second race member 5 or the housing 20. The retaining bolt 16 is easily mounted on the second race member and the housing and thereafter provided with its welded head 22. In the event it is desired to have a unitary assembly which can be more easily disassembled the head 22 can be secured to the shaft 18 in some other manner, as by screwing it on, keying it on, or by the use of suitable fasteners.

As will be seen from the foregoing a unitary assembly of an axial bearing and a housing is formed in which the connecting element, namely, the retaining means (bolt 16), is permitted to slide with respect to one of the members while being connected to the other. This permits the members to be moved axially and if the enlarged hole is provided, to even have a degree of radial movement, within defined limits. The sleeve bushing limits the depression of the spring without placing undue stress on the spring and permitting the housing and bearing to remain out of contact with each other. If desired, the bushing can be of enlarged diameter surrounding the spring. It may be welded or otherwise secured to the wall of the second race member.

It is further obvious that the concept of the present invention may be used with another type of bearing, such as a radial bearing, or in other clutch release mechanisms than the purely mechanical type shown.

Since various modifications, changes and embodiments have been suggested it is intended that the present disclosure be taken as illustrative only and not limiting the scope of the invention.

What is claimed:

1. A clutch release mechanism comprising a housing and a bearing assembly, said bearing assembly comprises a nonrotatable race member adapted to be connected to the operating element of the clutch, and a second race member and a plurality of rolling elements located therebetween, a retaining bolt connecting said second race member and said housing, said bolt being fixed with respect to said second race member and extending through a bore in said housing, a coil spring surrounding said bolt and normally urging said second race member and housing apart, and a bushing coaxially arranged with said spring and said bolt to limit the spring travel between said second race member and said housing on depression of said spring.

2. The release mechanism according to claim 1 wherein said sleeve is interposed between said spring and said retaining bolt.

3. The release mechanism according to claim 1 including means for limiting the outward movement of said housing with respect to said retaining bolt.

4. The release mechanism according to claim 1 wherein the bore in said housing is larger than the diameter of said bolt to permit said bolt radial play.

5. The release mechanism according to claim 1 wherein said housing is adapted to be centered in a bore of a supporting member by its outer mantle.

6. The release mechanism according to claim 1 wherein the edge of the second race member extends in an axial direction over the outer face of the first race member and is provided with an annular disk having an inner edge overlapping the outer face of the first race member.

* * * * *